April 2, 1957 K. E. B. BREDTSCHNEIDER 2,787,439
VALVE CONSTRUCTION
Filed Feb. 20, 1952 2 Sheets-Sheet 1
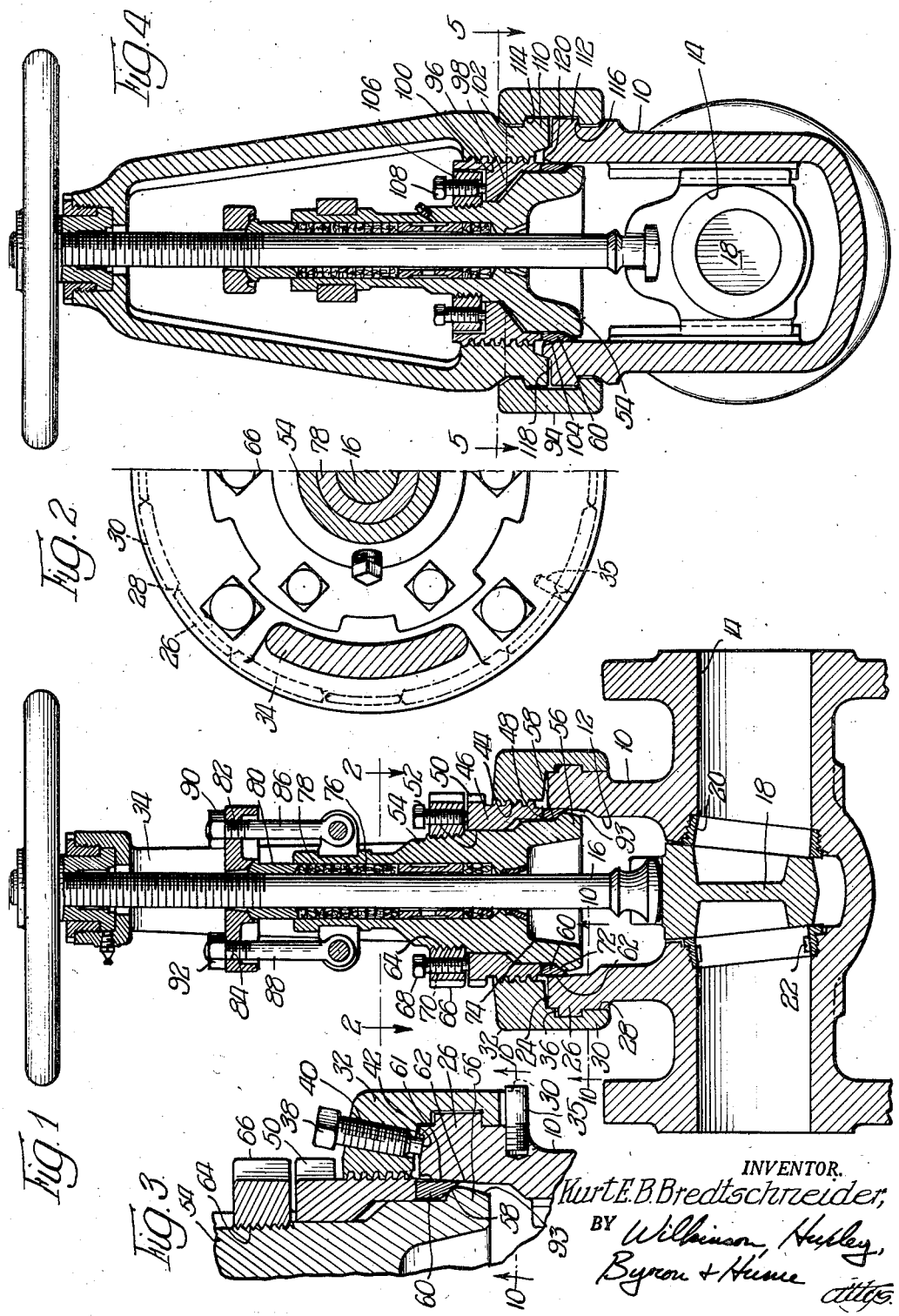
INVENTOR.
Kurt E. B. Bredtschneider,
BY Wilkinson, Huxley,
Byron + Hume
Attys.

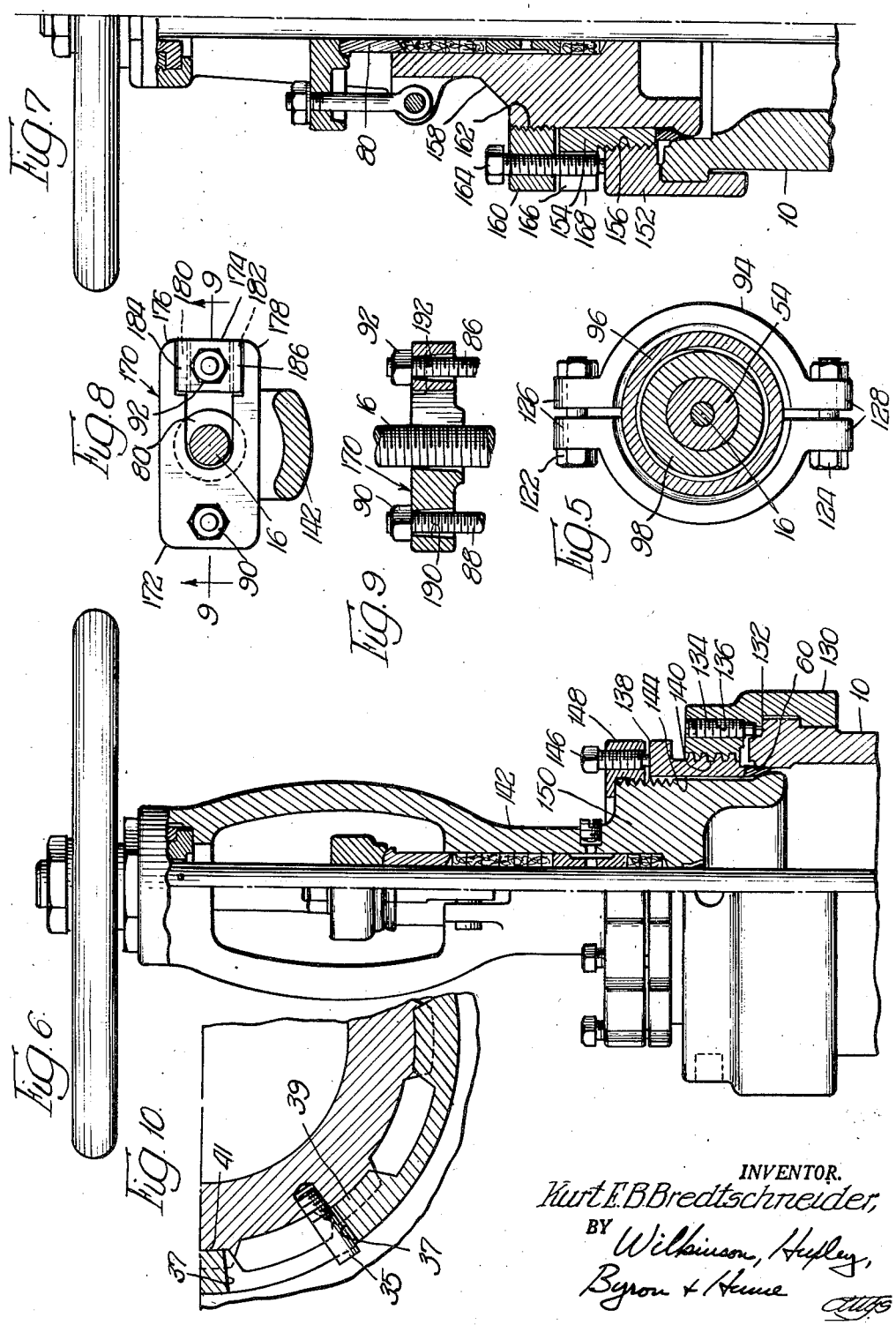

United States Patent Office 2,787,439
Patented Apr. 2, 1957

2,787,439

VALVE CONSTRUCTION

Kurt E. B. Bredtschneider, Chicago, Ill., assignor to Crane Co., Chicago, Ill., a corporation of Illinois Application February 20, 1952, Serial No. 272,659

16 Claims. (Cl. 251—329)

This invention relates to pressure vessels and more particularly to valves for use with fluids under high pressures, for example up to and even exceeding 2500 pounds per square inch. This application is a continuation-in-part of applicant's previous application Serial No. 186,337, filed September 23, 1950, now Patent No. 2,744,775 and represents an improvement over the invention disclosed therein, although it incorporates basically many of the novel features of that earlier invention.

Just as in the case of applicant's earlier filed application referred to above, one of the main advantages of the present invention when applied to valve construction is to provide a valve in which the pressure seal in the bonnet joint is formed at the extreme upper edge of the opening in the body of the valve in which the valve and valve carrying stem are disposed. This construction is made possible by providing an annular outer abutment member which is disposed in secured relation to the body member adjacent to, but wholly without, that opening, and an inner abutment member having a portion thereof normally disposed within that opening, the remaining portion of that inner member protruding from the opening in telescopic relation to the outer abutment member.

An axially opposed surface is provided on the outer abutment member which is substantially coincident with and disposed in overlapping relation to the outer extremity of the opening in the body of the valve. An axially opposed surface is also provided on the inner abutment member which latter surface is so aligned with the axially opposed surface on the outer abutment member that an annular sealing means may be disposed between the two opposed surfaces, so as to engage the upper edge of the wall of the opening.

In other words, it is an object of this invention to provide a pressure vessel such as a valve for high pressure fluids which has a sealing means whose sealing action varies with the pressure of the fluid, to be sealed, and yet which has only a portion of the sealing means disposed within the opening in the valve body.

A further object is to provide a pressure vessel sealing means which utilizes a sealing ring disposed so that it is adapted to be expanded by the cooperative action of outer and inner, telescopically disposed abutment members, against the inner wall of an opening in said pressure vessel such as a valve or the like.

Another object of the invention is to provide a pressure seal construction for pressure vessels, generally, incorporating a sealing ring, which is disposed in association with the upper edge of the main body of the vessel so that the upper portion of the ring is without the upper lip of the vessel and therefore is not exposed to the high temperatures within the vessel.

Yet another object is to provide a sealing ring and its associated bearing surfaces in such a pressure vessel which have a form and disposition such that there is initially only a line contact between the ring and the body wall of the vessel and between an inner abutment member which is adapted to exert outward pressure on the ring, so that freezing and sticking of the ring is eliminated.

It is still another object to provide a valve construction of the character described which, because of the unusual location of the sealing means therein may have the stuffing box disposed entirely without the body where it is less likely to be exposed to extreme temperatures.

Still another object is to provide a pressure vessel or valve construction of the character described in which the fastening surfaces between the outer abutment member and the body of the pressure vessel or valve (such as a breech lock coupling) are disposed on the outside of the body and are therefore easier to maintain and inspect, and are not exposed to the line fluid. Likewise, the means of securing these two members together may be utilized to reinforce the surface within the opening in the body against which the seal is formed.

Yet another object is to provide a valve construction of the character described in which the position of the outer abutment member relative to the body of the valve may be adjusted without affecting the position or adjustment of the yoke member or the coupling between the abutment member and the body of the valve.

A further object is to provide a valve construction of the character described in which the bearing surface on the wall of the opening which is abutted by the sealing ring, when the seal is made between the bonnet and the body of the valve, is very accessible. Therefore any special hard surfacing material may be easily applied to form that bearing surface, and it likewise will be easier to machine, inspect, and maintain. Similarly, this disposition of the bearing surface will make it a comparatively easy matter to remove or apply the sealing ring.

Still another object of the invention is to provide a lighter and more compact and less expensive bonnet and valve body which are relatively simple in design and yet which provide a seal which is in every way equal to or better than the seal previously formed in the valve construction over which the present construction is an improvement.

Yet another object of this invention is to provide a valve construction of the character described in which the yoke member may be given any desired radial position relative to the main body of the valve.

Other objects of this invention are: To provide a valve construction in which the yoke member is relatively small and simple to cast; in which means are provided capable of radial adjustment independently of the yoke for carrying out the pre-tightening of the sealing ring for the valve body opening; in which the bearing plate for the gland can be removed laterally to provide additional clearance for the placing of packing rings through the yoke opening; and in which, in certain embodiments, the yoke can be completely removed and a complete re-packing of the stuffing box carried out with continuous packing rings.

Further objects and advantages of this invention will become evident as the description proceeds and from an examination of the accompanying drawings which illustrate several embodiments of the invention and in which similar numerals refer to similar parts throughout the several views. Although all of the embodiments shown are pressure vessels in the form of valves, it is obvious that the form of seal disclosed therein could be utilized equally well to seal similar openings in other forms of pressure vessels.

In the drawings:

Figure 1 is a view in elevation partly in vertical section of one form of pressure-seal bonnet valve embodying this invention;

Figure 2 is a fragmentary enlarged plan view, partly in horizontal section, of one-half of the valve shown in Figure 1, the view being taken along the line 2—2 thereof;

Figure 3 is a fragmentary enlarged view in elevation, partly in vertical section, of a portion of the valve shown in Figure 1, showing the yoke adjustment bolts;

Figure 4 is a view in elevation, partly in vertical section, of an alternative form of pressure-seal bonnet valve embodying this invention;

Figure 5 is a view in horizontal section of the valve shown in Figure 4, the view being taken along the line 5—5 thereof showing the two-part clamping ring in more detail;

Figure 6 is a fragmentary view in elevation, partly in vertical section, of still another alternative form of pressure-seal bonnet valve embodying this invention;

Figure 7 is a fragmentary view in elevation, partly in vertical section, of yet another form of pressure-seal bonnet valve embodying this invention;

Figure 8 is a fragmentary plan view, partly in horizontal section, of a portion of the valve shown in Figure 6;

Figure 9 is a fragmentary view in vertical section of the portion of the valve shown in Figure 8, the view being taken along the line 9—9 thereof;

Figure 10 is a fragmentary view in horizontal section of a portion of the valve shown in Figure 1, the view being taken along the line 10—10 thereof.

Referring now to Figures 1, 2 and 3—

One form of pressure-seal bonnet valve embodying the invention is shown therein, the valve having a body 10 which is provided in turn with an opening 12 therein, which opening communicates with the through flow passage 14. The valve stem member 16 is disposed within the opening 12 and carries at its lower end the wedge disc 18 adapted to be seated on the body seat rings 20 and 22 to close the flow passage 14, when desired.

The upper lip 24 of the body 10 may have a plurality of spaced lugs 26 formed thereon adapted to cooperate with a plurality of similar spaced lugs 28 projecting inwardly from the lower lip 30 of the base 32 of the yoke member 34. The lugs 26 are formed with sufficient space therebetween to permit the lugs 28 on the base 32 of the yoke 34 to be inserted therethrough. The shoulder 36 is formed on the base 32 of the yoke 34 so that it projects inwardly and is spaced from the lugs 28 a sufficient distance to permit the lugs 26 on the body 10 to be received between the lugs 28 and the shoulder 36. When the valve is being assembled therefore, after the lugs 28 have been moved downwardly between the lugs 26, the base 32 of the yoke 34 may be rotated so that the lugs 28 are so received.

To insure that this bayonet or breech type of lock arrangement between the yoke and the body of the valve is secure, the bolts 38 may be provided which are adapted to be received in the threaded openings 40 in the base portion 32 of the yoke member 34. The lower extremities of the bolts 38 are adapted to bear against the bearing surfaces 42 formed in the upper lip 24 of the body member 10. This construction permits the yoke member 34 and its associate parts to be firmly disposed upon the lip 24 of the body member 10 by first causing the lugs 26 and 28 to be engaged and then successively tightening the bolts 38.

As best shown in Figures 3 and 10, the valve body 10 may have a stop member 35 threadedly received therein so that it is adapted, in turn, to be received in the recess 37 formed in the lower lip 30 of the base 32 of the yoke member 34. As best shown in Figure 10, this stop member 35 forms an abutment against which one of the lugs 28 on the base 32 of the yoke 34 will abut either when the lugs 28 are aligned with openings between the lugs 26, or when they are properly aligned with the lugs 26 themselves. In other words, when the base 32 of the yoke member 34 is in place, as shown in Figure 1, it may be turned only a short distance counterclockwise, as shown in Figure 10, until the lug 41 stops such movement. The lugs 28 will then be aligned with the openings between the lugs 26, so that the yoke member 34 may be then readily removed from association with the body 10.

On the other hand when the yoke 34 is turned in the opposite direction and the lug 39 is brought into abutment with the stop member 35, as shown in Figure 10, all of the lugs 28 on the base 32 of the yoke member 34 will be substantially aligned with the lugs 26 on the body 10 in the fully locked position. If it is desired to have the yoke 34 capable of being disposed in a number of different radial positions with respect to the body 10, then, of course, a number of recesses 37 must be provided.

The base 32 of the yoke 34 is also provided with the internally threaded opening 44 which is in turn adapted to receive the externally threaded outer abutment member 46. This latter member is provided with an axially opposed annular surface 48 at its lower end, and at its upper end is provided with lugs 50 which are adapted to cooperate with a suitable wrench so that the position of the surface 48 relative to the lip 24 of the body may be readily adjusted.

The outer abutment member 46 is provided with a central opening 52 which is adapted to receive an inner abutment member 54 which in turn receives the slidably mounted stem member 16. The lower end of the inner abutment member 54 has an annular lip 56 formed thereon which has an angularly disposed bearing surface 58 formed on the upper edge thereof. This surface 58 may preferably have a curved configuration. A sealing ring 60 may be disposed between the axially opposed surfaces 48 and 58 adjacent the inner surface 62 at the inner edge of the lip 24 of the body 10.

As best shown in Figure 3 the outer surface 61 of the sealing ring 60 has an angularly disposed bearing surface similar to the inner surface 62 of the lip 24. However, the angle formed by the outer surface of the sealing ring 60 is somewhat less than the angle formed by the surface 62. The diameter of the ring 60 is preferably such that only the lower edge of the outer surface of the sealing ring 60 abuts the surface 62. In addition, the height and diameter of the ring 60 is such that the upper edge thereof projects substantially above the upper edge of the lip 24 even when it is firmly seated on the inner surface 62 of the lip 24. This construction of the sealing ring and the surfaces associated therewith is fully described in applicant's copending application mentioned above.

Since the outer abutment member 46 is threadedly received within the base 32 of the yoke 34, it may be moved downwardly so as to seat and compress the sealing ring 60 on the sealing surface 62 as previously described. This preliminary tightening of the sealing ring 60 is a very desirable feature of the present invention, particularly since it can take place without the rotation of the yoke member 34, which has already been secured in place by the bolts 38, as previously described.

The central portion of the inner abutment member 54 may be threaded as at 64 so that the abutment ring 66 may be threadedly received thereon. This ring, in turn, is provided with a plurality of bolts 68 threadedly received in the threaded openings 70, therein, which bolts are adapted to abut the upper surface of the outer abutment member 46, as best shown in Figure 1.

After the preliminary tightening of the sealing ring 60 has taken place, the bolts 68 may be tightened in order to draw up the inner abutment member 54 relative to the outer abutment member 46. Such movement of the inner abutment member will cause the axially opposed surface 58 thereof to be forced against the beveled edge 72 of the sealing ring 60, to compress the latter and to form a tight seal therebetween. Such compression of the sealing ring 60 will in turn tend to increase the seal formed between the surface 62 and the outer surface 61 of the sealing ring 60.

As fully explained in applicant's copending application identified above, the form of the sealing ring and the configuration of the surfaces associated therewith, as best shown in Figure 3, provide a number of significant advantages. The disposition of the upper part of the sealing ring outside of the valve opening, together with the initial line contact that exists between the inner abutment member and the sealing ring, and the beveled upper edge of the body and the sealing ring, all cooperate to overcome certain disadvantages which have previously been inherent in pressure seal valves of this general type.

Obviously when the valve is subjected to very high pressures, the sealing ring in turn will be subjected to forces sufficient to cause it to become distorted. If at the same time the sealing ring is at a relatively high temperature, the distortion of the ring may take the form of a plastic flow. When such distortion occurs in a conventional form of sealing ring disposed in a conventional manner in the body of the valve, the end result is very likely to be a freezing or sticking of the sealing ring when the pressure is subsequently released. Applicant has succeeded in overcoming this undesirable characteristic by giving the sealing ring and its associated surfaces a novel form and disposition.

The fact that the sealing ring is disposed so that the upper portion thereof is without the valve opening operates to prevent the upper portion of the sealing ring from being exposed to the high temperatures that exist within the valve opening below the sealing ring so that the upper portion of the ring remains relatively cool. This characteristic, in combination with the fact that pressure is initially applied to only the bottom portion of the sealing ring, confines any substantial permanent distortion, or plastic flow, to the bottom portion of the ring.

Also, since the structure is such that there is initially only a line contact between the inner abutment member and the sealing ring, and between the body wall and the sealing ring, upward pressure exerted on the sealing ring by the abutment member causes the sealing ring to expand outwardly. This expansion in the upper relatively cool portion of the sealing ring is merely an elastic displacement, and when the pressure is subsequently released, the upper portion of the ring will immediately regain substantially its initial form. This recovery which occurs in the upper portion of the sealing ring obviously will tend to overcome any freezing or sticking in the lower portion of the sealing ring since there will be a strong tendency for the ring to return to its initial line contact with the surfaces associated therewith.

Of course when high pressures are applied to the base 74 of the inner abutment member 54, the latter will tend to move upwardly, as shown in Figure 1, which movement however will serve only to increase the tightness of the seal formed by the sealing ring 60. To achieve leak free operation it is therefore only necessary, in a valve of this construction, to tighten the bolts 68 sufficiently to form a preliminary seal, which seal is automatically made more positive by the pressure applied to the base 74 of the inner abutment member 54 by the fluid which is being controlled by the valve.

As previously stated the valve stem 16 is slidably disposed in the inner abutment member 54 so that it is freely movable longitudinally. In order to form a suitable seal between the inner abutment member 54 and the stem 16 an annular stuffing box 76 may be provided in the upper end of the inner abutment member 54, which stuffing box is adapted to be filled with suitable packing rings 78. A gland member 80 is slidably mounted on the stem 16 in encompassing relation thereto so that its lower end is adapted to bear against the upper end of the superposed packing ring 78. A suitable bearing plate such as is shown in greater detail in another modification in Figures 8 and 9 may be provided which may have openings 82 and 84 therein which, in turn, may be adapted to receive the bolt members 86 and 88 respectively. The lower ends of the bolt members 86 and 88 may be pivotally secured to the upper end of the inner abutment member 54 and the upper ends thereof, after being inserted through the openings 82 and 84, may receive suitable holding members such as the nut members 90 and 92. These nut members may be tightened sufficiently to cause the gland member 80 to be compressed against the packing rings 78, as desired, so that a pressure tight seal is formed between the inner abutment member 54 and the stem 16.

An additional novel feature is shown in Figures 1 and 3 in that the lower edge 93 of the inner abutment member 54 is beveled so that it extends downwardly and inwardly away from the inner wall of the opening 12 in the body 10 of the valve. This construction has been found to be particularly useful in connection with valves which are used to handle petroleum products, and the like, since such products often tend to cause coking to occur within the valve opening. Such a relatively hard deposit building up between the lower edge of the inner abutment member 54 and the inner surface of the valve opening 12 often will cause the inner abutment member 54 to be frozen so that it is no longer free to move in a manner such that it will cause the sealing ring to form a satisfactory seal, or is impossible to remove from the valve opening. By providing the inner abutment member with the beveled lower edge 93, any bonding that occurs between the inner abutment member and the valve opening through a deposit of coke at this point can be easily broken because of the searing action that takes place when the inner abutment member is moved upwardly. Referring now to Figures 4 and 5, another form of valve member embodying the invention is shown therein which differs in some respects from the form just described. The clamping ring 94, for example, is used to secure the yoke member 96 to the body 10 of the valve. This form of valve is also provided with an outer abutment member 98 which is adapted to be threadedly received within the threaded opening 100 in the base 102 of the yoke 96. The lower end of the outer abutment member 98 is provided with an axially opposed surface 104 similar to the surface 48 in the valve shown in Figure 1. By suitable rotation of the outer abutment member 98 relative to the base 102 of the yoke 96 the sealing ring 60 may be pre-tightened, as previously described in connection with the outer abutment member 46 shown in Figure 1.

An inner abutment member 54 is also provided in this form of valve which member has threadedly secured thereto an abutment ring 106 of substantially the same character as the abutment ring 66, shown in Figure 1. This abutment ring is likewise provided with bolt members 108 which are adapted to abut the upper surface of the outer abutment member 98 and which may be tightened to draw up the inner abutment member 54 so that the sealing ring 60 is compressed, substantially as previously described in connection with the first described embodiment.

This form of valve is sometimes preferable to that shown in Figure 1 since no rotation of yoke 96 is necessary to secure that member to the main body of the valve 10. To this end the shoulders 110 and 112 are provided on the base and the upper end of the yoke 96 and the body 10, respectively. The upper and lower surfaces of the shoulders 110 and 112, respectively, are tapered so that the complementary tapered shoulders 114 and 116 on the inner surface of the clamping ring 94 are adapted to draw together the base of the yoke 110 and the upper surface 118 of the body 10 when the ring is tightened. The inner edge of the surface 118 may have an annular alignment shoulder 120 formed thereon to aid in properly positioning the base 102 of the yoke 96 with respect to the body member 10.

As best shown in Figure 5 the clamping ring 94 may be made of two substantially identical portions which are adapted to be secured in opposing relation on the upper end of the body 10 by the bolt members 122 and 124 which are adapted to be received in the lugs 126 and 128 respectively.

Referring now to Figure 6, still another type of valve embodying the invention is disclosed therein. The main body of the valve 10 being provided with a collar 130 adapted to be secured to the upper edge of the body 10 in substantially the same fashion as the collar 32 shown in Figure 1. The upper edge of the body 10 is provided with an annular recess 132 along the outer circumference thereof which recess 132 is adapted to receive the set screws 134 threadedly received in the openings 136 of the collar 130. An outer abutment member 138 is adapted to be threadedly received in the threaded opening 140 in the collar 130 and its lower edge is adapted to abut the sealing ring 60 in the manner previously described for the embodiment shown in Figures 1 and 4.

A combined inner abutment and yoke member 142 is provided which is adapted to be telescopically disposed in the central opening 144 in the outer abutment member 138 and to be adjusted relative to the latter by appropriate movement of the bolts 146 which are threadedly received in the abutment collar 148. The collar 148 is in turn threadedly secured to the central portion 150 of the combined inner abutment member and yoke member. Adjustment of this form of invention is substantially the same as the adjustment fully described for the form shown in Figure 1.

Still another form of the invention is disclosed in Figure 7 in which the upper edge of the body 10 of the valve has a collar member 152 secured thereto in substantially the same fashion as the collar member 32 in the form shown in Figure 1. An outer abutment member 154 is provided which is adapted to be threadedly received within the threaded central opening 156 in the collar 152. This outer abutment member is adapted to abut the sealing ring 60 in substantially the same fashion as the outer abutment members 46, 98 and 138, previously described in connection with the embodiment shown in Figures 1, 4 and 6, respectively. An inner abutment member 158, substantially the same as the inner abutment member 54 shown in Figure 1, is also provided. The abutment collar 160 is threadedly received on the externally threaded portion 162 of the inner abutment member 158 and has the bolt members 164 threadedly received therein which are adapted to extend downwardly through suitable openings 166 provided in the upper flange 168 of the outer abutment member 154 so as to abut the upper surface of the collar member 152.

As previously mentioned, all of the forms of valves disclosed herein may be provided with a suitable bearing plate, indicated generally by the numeral 170, and shown in detail in Figures 8 and 9. The bearing plate 170 may be made up of two parts, such as the substantially U-shaped piece 172 and the complementary lug member 174 adapted to be received between the arms 176 and 178 of the U. The two arms 176 and 178 are both provided with an inwardly beveled portion 180 and 182, respectively, at their outer extremities and the lug member 174 is provided with two similarly beveled portions 184 and 186 which are adapted to be received in the beveled portions of the two arms 176 and 178, respectively.

Both the U-shaped piece 172 and the lug member 174 have suitable openings 190 and 192 therein, respectively, which are adapted to receive the upper ends of the bolt members 88 and 86, respectively. Since the lower ends of the bolt members 86 and 88 are pivotally secured to the upper end of the inner abutment member of the valve, the bearing plate 170 may be drawn downwardly, as viewed in Figure 9, as a unit by suitable tightening of the nut members 90 and 92. Although this member acts as a unit in this fashion because of its novel construction, it may be readily removed from association with the valve stem 16 by loosening the nut members 90 and 92 sufficiently so that the lug member 174 may be unseated sufficiently to permit it to be removed from association with the U-shaped piece 172. When this is accomplished, both the bolt members 86 and 88 may be pivoted outwardly away from the valve stem 16 carrying with them the lug member 174 and the U-shaped piece 172 associated therewith, respectively. The gland member 80 may then be moved upwardly on the stem 16 out of association with the packing rings 76 to permit readily access thereto.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, a stem disposed within said opening freely slidable axially in said inner member, and a member carried by said stem for closing said flow passage.

2. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, means for moving said outer and inner members axially relative to each other to compress said annular sealing ring between said axially opposed surfaces and against said wall of said opening, a stem disposed within said opening freely slidable axially in said inner member, and a member carried by said stem for closing said flow passage.

3. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, a second axially opposed surface on said outer member, an abutment ring screw threaded on said inner member adapted to bear against said second axially opposed surface to move said outer and inner members axially relative to each other to compress said sealing ring between said axially opposed surfaces and against said wall of said opening, a stem disposed within said opening freely slidable axially in said inner member, and a member carried by said stem for closing said flow passage.

4. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, a second axially opposed surface on said outer member, an abutment ring screw threaded on said inner member adapted to bear against said second axially opposed surface and to move said outer and inner members axially relative to each other to compress said sealing ring between said axially opposed surfaces and against said wall of said opening, a yoke member disposed in secured relation to said inner member, a stem member freely slidable axially in said inner member, a member carried by said stem member for closing said flow passage, a gland member slidably encompassing said stem member, an opening through said yoke member exposing said stem member and said gland member, a bearing plate member adapted to be inserted in said opening into association with said stem member so as to bear against said gland member, and means secured to said yoke member for forcing said plate down on said gland member.

5. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, a second axially opposed surface on said outer member, an abutment ring screw threaded on said surface and to move said outer and inner members axially relative to each other, to compress said sealing ring between said axially opposed surfaces and against said wall of said opening, a yoke member supported by said inner member, a stem member freely slidable axially in said inner member, a member carried by said stem member for closing said flow passage, a gland member slidably encompassing said stem member, an opening through said yoke member exposing said stem member and said gland member, a bearing plate member adapted to be inserted in said opening into association with said stem member so as to bear against said gland member, and means secured to said inner member adapted to bear against said bearing plate member.

6. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, a second axially opposed surface on said outer member, an abutment ring screw threaded on said inner member adapted to bear against said second axially opposed surface and to move said outer and inner members axially relative to each other, to compress said sealing ring between said axially opposed surfaces and against said wall of said opening, a yoke member formed integrally with said collar member, a stem member freely slidable axially in said inner member, a member carried by said stem member for closing said flow passage, a gland member slidably encompassing said stem member, an opening through said yoke member exposing said stem member and said gland member, a bearing plate member adapted to be inserted in said opening into association with said stem member so as to bear against said gland member, and means secured to said inner member adapted to bear against said bearing plate member.

7. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces so as to engage the wall of said opening and having a substantial portion thereof protruding out of said opening, an abutment member screw threaded on said inner member, a plurality of abutment screws threaded through said abutment member adapted to abut said outer member and to move said outer and inner members axially relative to each other to compress said sealing ring between said axially opposed surfaces and against said wall of said opening, a stem disposed within said opening, freely slidable axially in said inner member, and a member carried by said stem for closing said flow passage.

8. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces so as to engage the wall of said opening and having a substantial portion thereof protruding out of said opening, an abutment member screw threaded on said inner member and a plurality of abutment screws threaded through said abutment member adapted to abut said outer member and to move said outer and inner members axially relative to each other to compress said sealing ring between said axially opposed surfaces and against said wall of said opening, a stem member disposed within said opening freely slidable axially in said inner member, a member carried by said stem member for closing said flow passage, a yoke member secured to said body member in supporting association with said stem member, a gland member slidably encompassing said stem member, an opening through said yoke member exposing said stem member and said gland member, a bearing plate member adapted to be inserted in said opening into association with said stem member so as to bear against said gland member, and means secured to said inner member adapted to bear against said bearing plate member.

9. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces so as to engage the wall of said opening and having a substantial portion thereof protruding out of said opening, an abutment member screw threaded on said inner member, a plurality of abutment screws threaded through said abutment member adapted to abut said collar member, and to move said outer and inner members axially relative to each other to compress said sealing ring between said axially opposed surfaces and against said wall of said opening, a stem disposed within said opening freely slidable axially in said inner member, and a member carried by said stem for closing said flow passage.

10. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces so as to engage the wall of said opening and having a substantial portion thereof protruding out of said opening, a yoke member formed integrally with said inner member, an abutment member screw threaded on said inner member, a plurality of abutment screws threaded through said abutment member adapted to abut said outer member and to move said outer and inner members axially relative to each other to compress said sealing ring between said axially opposed surfaces and against said wall of said opening, a stem disposed within said opening freely slidable axially in said inner member, and a member carried by said stem for closing said flow passage.

11. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, a yoke member formed integrally with said inner member, an abutment member screw threaded on said inner member, a plurality of abutment screws threaded through said abutment member adapted to abut said outer member and to move said outer and inner members axially relative to each other to compress said sealing ring between said axially opposed surfaces and against said wall of said opening, a stem disposed within said opening freely slidable axially in said inner member, and a member carried by said stem for closing said flow passage.

12. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, a yoke member adapted to be held in removably secured relation to said end of said body member by said collar member, said outer member being normally screw threaded in said yoke member and disposed wholly without said opening, axially opposed surfaces on said outer member and said inner member, annular sealing ring means disposed between said opposed surfaces engaging the wall of said opening and having a substantial portion thereof protruding out of said opening, an abutment member screw threaded on said inner member, a plurality of abutment screws threaded through said abutment member adapted to abut said outer member and to move said outer and inner members axially relative to each other to compress said sealing ring between said axially opposed surfaces and against said wall of said opening, a stem disposed within said opening freely slidable axially in said inner member, and a member carried by said stem for closing said flow passage.

13. A valve for high pressure fluid comprising a body member having an opening therein communicating with a flow passage, outer and inner telescoped annular members associated with said opening, a portion of said inner member being normally disposed in said opening, a yoke member, a collar member removably securing said yoke member to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, a stem disposed within said opening freely slidable axially in said inner member, and a member carried by said stem for closing said flow passage.

14. A valve for high pressure fluid comprising a body member having an opening therein communicating with a flow passage, outer and inner telescoped annular members associated with said opening, a portion of said inner member being normally disposed in said opening, a collar member removably secured to the end of said body member having said opening therein, said outer annular member being normally disposed in removably secured relation to said collar member wholly without said opening, axially opposed surfaces on said outer member and said inner member, annular sealing ring means disposed between said opposed surfaces engaging the wall of said opening and having a substantial portion thereof protruding out of said opening, an abutment member screw threaded on said inner member, and a plurality of abutment screws threaded through said abutment member adapted to abut said outer member so that said inner member may be moved axially with respect to said outer member, a plurality of abutment screws threaded through said collar member adapted to abut said body member, a stem disposed within said opening freely slidable axially in said inner member, and a member carried by said stem for closing said flow passage.

15. A valve for high pressure fluid comprising a body member having an opening therein communicating with a flow passage, outer and inner telescoped annular members associated with said opening, a portion of said inner member being normally disposed in said opening, a plurality of lugs on said body member, a collar member, a plurality of additional lugs on said collar member adapted to cooperate with the lugs on said body member to secure said collar member to the end of said body member having said opening therein, said outer annular member being normally disposed in removably secured relation to said collar member wholly without said opening axially opposed surfaces on said outer member and said inner member, annular sealing ring means disposed between said opposed surfaces engaging the wall of said opening and having a substantial portion thereof protruding out of said opening, a stem disposed within said opening freely slidable axially in said inner member, and a member carried by said stem for closing said flow passage.

16. A valve for high pressure fluid comprising a body member having an opening therein communicating with a flow passage, outer and inner telescoped annular members associated with said opening, a portion of said inner member being normally disposed in said opening, a yoke member, a collar member in the form of a split ring clamp adapted to secure said yoke member to the end of said body member having said opening therein, said outer member being normally screw threaded in said yoke member and disposed wholly without said opening, axially opposed surfaces on said outer member and said inner member, annular sealing ring means disposed between said opposed surfaces engaging the wall of said opening and having a substantial portion thereof protruding out of said opening, a stem disposed within said opening freely slidable axially in said inner member, and a member carried by said stem for closing said flow passage.

References Cited in the file of this patent
UNITED STATES PATENTS

| | | |
|---|---|---|
| 2,012,427 | Haun | Aug. 27, 1935 |
| 2,065,870 | Parr | Dec. 29, 1936 |
| 2,289,632 | Dalzell et al. | July 14, 1942 |
| 2,321,597 | Hobbs | July 15, 1943 |
| 2,389,118 | Buehner | Nov. 20, 1945 |
| 2,424,449 | Gasche | July 22, 1947 |
| 2,515,498 | De Craene et al. | July 18, 1950 |
| 2,576,592 | Giauque | Nov. 27, 1951 |
| 2,610,820 | Markel | Sept. 16, 1952 |
| 2,617,554 | Smith | Nov. 11, 1952 |